United States Patent
Asano et al.

(10) Patent No.: US 8,205,052 B2
(45) Date of Patent: Jun. 19, 2012

(54) PREVENTING OPERATIONS FROM UNAUTHORIZED USERS ON PAIRED STORAGE VOLUMES

(75) Inventors: Masayasu Asano, Yokohama (JP);
Takayuki Nagai, Yokohama (JP);
Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/493,395

(22) Filed: Jun. 29, 2009

(65) Prior Publication Data

US 2009/0265522 A1 Oct. 22, 2009

Related U.S. Application Data

(63) Continuation of application No. 11/121,142, filed on May 4, 2005, now Pat. No. 7,555,623.

(30) Foreign Application Priority Data

Feb. 24, 2005 (JP) ................. 2005-049371

(51) Int. Cl.
*G06F 12/14* (2006.01)
(52) U.S. Cl. ................. 711/163; 711/E12.091
(58) Field of Classification Search ................. 711/151, 711/163, E12.091
See application file for complete search history.

(56) References Cited

U.S. PATENT DOCUMENTS

| | | | |
|---|---|---|---|
| 7,096,338 B2 | 8/2006 | Takahashi et al. | |
| 7,137,031 B2 | 11/2006 | Taguchi | |
| 7,185,192 B1 | 2/2007 | Kahn | |
| 7,555,623 B2 * | 6/2009 | Asano et al. | 711/163 |
| 2001/0020254 A1 | 9/2001 | Blumenau et al. | |
| 2001/0027501 A1 * | 10/2001 | O'Hare et al. | 710/107 |
| 2003/0088746 A1 * | 5/2003 | Hino et al. | 711/162 |
| 2003/0115324 A1 | 6/2003 | Blumenau et al. | |
| 2003/0172069 A1 | 9/2003 | Uchiyama et al. | |
| 2004/0015668 A1 | 1/2004 | McBrearty et al. | |
| 2004/0148479 A1 | 7/2004 | Patel et al. | |
| 2004/0243778 A1 * | 12/2004 | Barrios et al. | 711/165 |
| 2005/0010734 A1 | 1/2005 | Soejima et al. | |
| 2005/0097271 A1 * | 5/2005 | Davies et al. | 711/114 |
| 2006/0095705 A1 | 5/2006 | Wichelman et al. | |

FOREIGN PATENT DOCUMENTS

| | | |
|---|---|---|
| JP | 2002-041345 | 2/2002 |
| JP | 2002-529804 | 9/2002 |
| JP | 2003-330622 | 11/2003 |

* cited by examiner

*Primary Examiner* — Hal Schnee
(74) *Attorney, Agent, or Firm* — Antonelli, Terry, Stout & Kraus, LLP.

(57) ABSTRACT

A computer system including a copy source volume and a copy target volume which may be selectably PAIRED or SPLIT. User management information stores: an entry indicating that a first user is permitted to effect a PAIR operation and a PATH operation; and, an entry indicating that a second user is permitted to effect a PATH operation. Operation management information indicates permitted PATH and PAIR operations in relation to each user and a volume's PAIR or SPLIT status, and stores: an entry indicating that the first user is permitted to effect the PAIR operation in which the PAIR status is PAIR, or is SPLIT WITH BACKUP DISABLED; and, an entry indicating that the second user is permitted to effect the PATH operations in which the PAIR status is SPLIT WITH BACKUP ENABLED. PAIR management information stores the PAIR status and the BACKUP ENABLED or DISABLED status.

3 Claims, 10 Drawing Sheets

| SHARED VOLUME | OPERATION | VOLUME STATUS | ALLOWED USER | DYNAMIC SETUP | RESOURCE DELEGATION |
|---|---|---|---|---|---|
| VOL1 | PATH | NOT GUARDED | 1 | | |
| VOL1 | PATH | GUARDED | 3 | | YES |
| VOL1 | PAIR | NOT GUARDED | 1 | | |
| VOL1 | PAIR | GUARDED | 3 | | YES |
| VOL1 | GUARD | | 3 | | |
| VOL2 | PATH | PAIRING (OR NOT PAIRED) | 1 | | |
| VOL2 | PATH | PAIR SPLIT, BACKUP PERMITTED | 2 | YES | |
| VOL2 | PATH | PAIR SPLIT, BACKUP NOT PERMITTED | 1 | | |
| VOL2 | PAIR | PAIRING (OR NOT PAIRED) | 1 | | |
| VOL2 | PAIR | PAIR SPLIT, BACKUP PERMITTED | | | |
| VOL2 | PAIR | PAIR SPLIT, BACKUP NOT PERMITTED | 1 | | |

600: SHARED VOLUME OPERATION MANAGEMENT CORRESPONDENCE TABLE

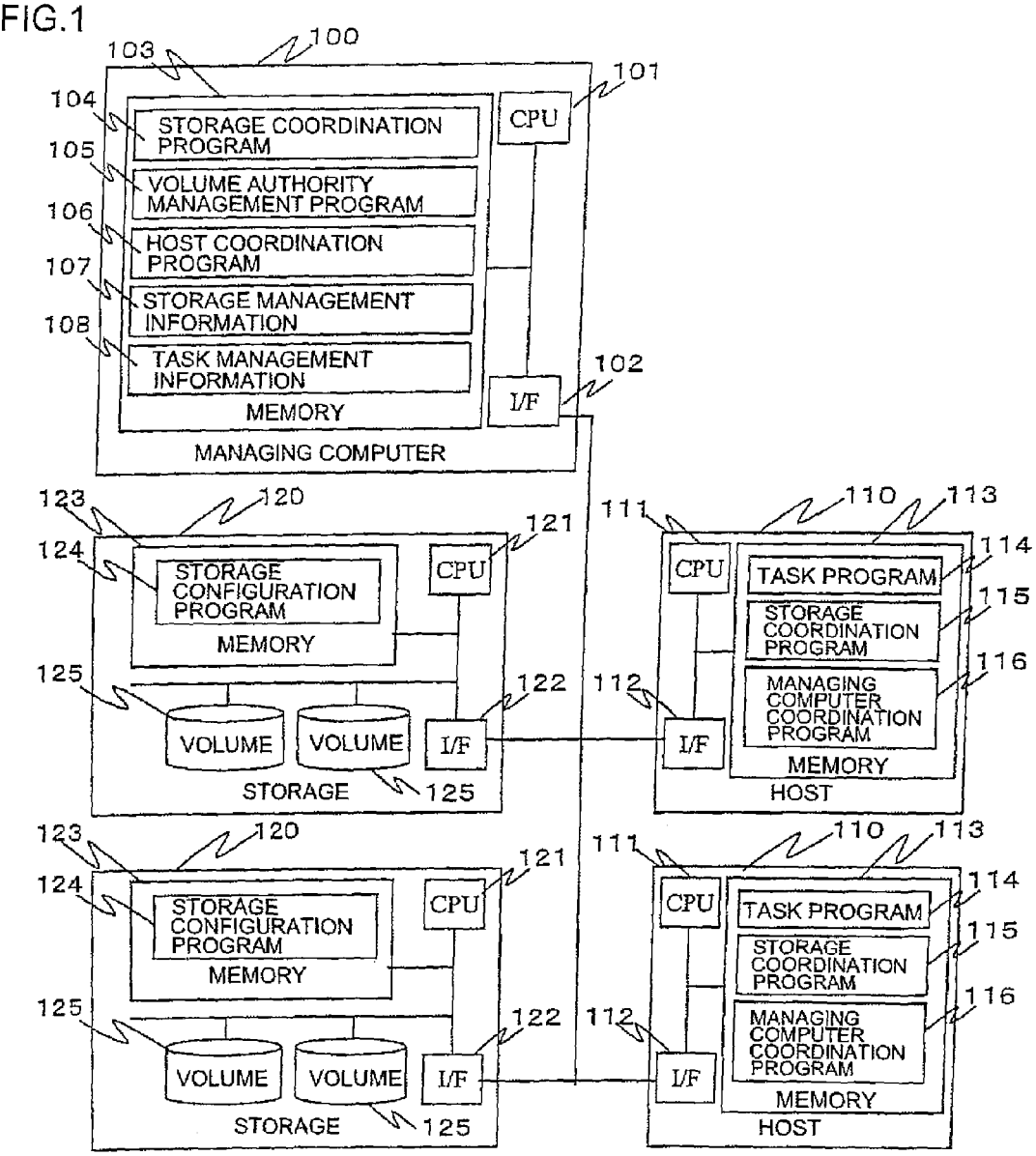

Volume Management Table (200)

| VOLUME ID (200) | STORAGE ID (201) | STORAGE VOLUME ID (202) | PORT ID (203) | HOST ID (204) | GUARD (205) | BACKUP PERMISSION (206) |
|---|---|---|---|---|---|---|
| VOL1 | 1 | 1 | PORT-A | HOST-A | NOT GUARDED | NOT PERMITTED |
| VOL2 | 1 | 2 | PORT-A1 | HOST-B | NOT GUARDED | NOT PERMITTED |
| VOL3 | 1 | 3 | | | NOT GUARDED | NOT PERMITTED |
| VOL4 | 1 | 4 | | | NOT GUARDED | NOT PERMITTED |
| VOL5 | 2 | 1 | PORT-B | HOST-C | NOT GUARDED | NOT PERMITTED |
| VOL6 | 2 | 2 | | | NOT GUARDED | NOT PERMITTED |
| VOL7 | 3 | 1 | PORT-C | HOST-B | NOT GUARDED | NOT PERMITTED |

Port Management Table (210)

| PORT ID (210) | STORAGE ID (211) | STORAGE PORT ID (212) |
|---|---|---|
| PORT-A | 1 | A |
| PORT-A1 | 1 | A1 |
| PORT-B | 2 | B |
| PORT-C | 3 | C |

Pair Management Table (220)

| PAIR ID (220) | REPLICATION SOURCE (221) | REPLICATION DESTINATION (222) | STATUS (223) |
|---|---|---|---|
| 1 | VOL1 | VOL2 | PAIRING |
| 1 | VOL1 | VOL5 | PAIRING |

200: VOLUME MANAGEMENT TABLE   210: PORT MANAGEMENT TABLE
220: PAIR MANAGEMENT TABLE

FIG.3

| TASK | OPERATION |
|---|---|
| STORAGE | PATH PAIR |
| BACKUP | PATH |
| GUARD SETUP | GUARD |

| USER ID | TASK | MANAGED RESOURCE | PASSWORD |
|---|---|---|---|
| 1 | STORAGE | VOL1, VOL2, PORT-A, PORT-A1, HOST-A, HOST-B | **** |
| 2 | BACKUP | VOL2, VOL7, PORT-A1, PORT-C, HOST-B | **** |
| 3 | GUARD SETUP | VOL1, HOST-A | **** |

300: TASK OPERATION TABLE

310: USER MANAGEMENT TABLE

FIG.4

| TASK | OPERATION |
|------|-----------|
| PATH | PATH |
| PAIR | PAIR |

| USER ID | TASK | MANAGED RESOURCE | PASSWORD |
|---------|------|------------------|----------|
| 11 | PATH | VOL1, VOL2, VOL5, VOL6, PORT-A, PORT-B, HOST-A, HOST-B | **** |
| 12 | PAIR | VOL1, VOL5, HOST-A, HOST-C | **** |

400: TASK OPERATION TABLE
410: USER MANAGEMENT TABLE

FIG.5

| OPERATION | VOLUME STATUS | TASK | DYNAMIC SETUP | RESOURCE DELEGATION |
|---|---|---|---|---|
| PATH | NOT GUARDED | STORAGE | | |
| PATH | GUARDED | GUARD SETUP | | YES |
| PATH | PAIRING (OR NOT PAIRED), NOT GUARDED | STORAGE | | |
| PATH | PAIR SPLIT, BACKUP PERMITTED, NOT GUARDED | BACKUP | YES | |
| PATH | PAIR SPLIT, BACKUP NOT PERMITTED, NOT GUARDED | STORAGE | | |
| PAIR | PAIRING (OR NOT PAIRED), NOT GUARDED | STORAGE | | |
| PAIR | PAIR SPLIT, BACKUP PERMITTED, NOT GUARDED | | | |
| PAIR | GUARDED | GUARD SETUP | | YES |
| GUARD | | GUARD SETUP | | |

500: SHARED VOLUME OPERATION MANAGEMENT TABLE

FIG.6

| SHARED VOLUME | OPERATION | VOLUME STATUS | ALLOWED USER | DYNAMIC SETUP | RESOURCE DELEGATION |
|---|---|---|---|---|---|
| VOL1 | PATH | NOT GUARDED | 1 | | |
| VOL1 | PATH | GUARDED | 3 | | YES |
| VOL1 | PAIR | NOT GUARDED | 1 | | |
| VOL1 | PAIR | GUARDED | 3 | | YES |
| VOL1 | GUARD | | 3 | | |
| VOL2 | PATH | PAIRING (OR NOT PAIRED) | 1 | | |
| VOL2 | PATH | PAIR SPLIT, BACKUP PERMITTED | 2 | YES | |
| VOL2 | PATH | PAIR SPLIT, BACKUP NOT PERMITTED | 1 | | |
| VOL2 | PAIR | PAIRING (OR NOT PAIRED) | 1 | | |
| VOL2 | PAIR | PAIR SPLIT, BACKUP PERMITTED | | | |
| VOL2 | PAIR | PAIR SPLIT, BACKUP NOT PERMITTED | 1 | | |

600: SHARED VOLUME OPERATION MANAGEMENT CORRESPONDENCE TABLE

FIG.7

| OPERATION | VOLUME STATUS | AVAILABLE TASK | DYNAMIC SETUP | RESOURCE DELEGATION |
|---|---|---|---|---|
| PATH | NOT PAIRED | PATH | | |
| PATH | PAIRED | PAIR | | YES |
| PAIR | | PAIR | | |

700: SHARED VOLUME OPERATION MANAGEMENT TABLE

FIG.8

| SHARED VOLUME | OPERATION | VOLUME STATUS | ALLOWED USER | DYNAMIC SETUP | RESOURCE DELEGATION |
|---|---|---|---|---|---|
| VOL1 | PATH | NOT PAIRED | 11 | | |
| VOL1 | PATH | PAIRED | 12 | | YES |
| VOL1 | PAIR | | 12 | | |
| VOL5 | PATH | NOT PAIRED | 11 | | |
| VOL5 | PATH | PAIRED | 12 | | YES |
| VOL5 | PAIR | | 12 | | |

800: SHARED VOLUME OPERATION MANAGEMENT CORRESPONDENCE TABLE

PREVENTING OPERATIONS FROM UNAUTHORIZED USERS ON PAIRED STORAGE VOLUMES

CROSS REFERENCE TO RELATED APPLICATION

This is a continuation of U.S. application Ser. No. 11/121,142, filed May 4, 2005 now U.S. Pat. No. 7,555,623. This application relates to and claims priority from Japanese Patent Application No. 2005-049371, filed on Feb. 24, 2005. The entirety of the contents and subject matter of all of the above is incorporated herein by reference.

BACKGROUND

The invention relates to a volume management method for managing volumes in which the authority for operating an identical volume in a storage is regulated to avoid misoperations by users and to allow normal operation of the volume when a plurality of users manage the identical volume depending on the task of the users employing the volumes.

With an increasing amount of storage data, computer systems under corporate or other operation management include an increasing number of computer systems using high-capacity storage, and computer systems using a plurality of storages interconnected by SAN (Storage Area Network) which is a storage-dedicated network (primarily Fibre Channel) or IP (Internet Protocol) in which computers share a high capacity of data distributed among a plurality of storages. Moreover, for improved storage availability and other purposes, many storages have been provided with an increased number of, and enhanced capabilities. In the computer systems as described above, the increased amount of data to be managed complicates the operation management of storage, and also increases its cost. For this reason, a technique has been proposed for dividing a management range to divide users managing a plurality of storages in a storage network and high-capacity storages (e.g., Japanese Laid-Open Patent Application 2003-330622, hereinafter referred to as Patent Document 1).

In the technique disclosed in Patent Document 1, accessible volumes are assigned to users or hosts and their management authorities can be set up. According to Patent Document 1, the management range of the users can be clarified for each volume.

In another technique for enhanced capabilities of storage, in order to avoid the lowering of performance of an on-line process during a backup process, volumes in a storage are duplexed to replicate data for the on-line process. A server performing the backup process (backup server) treats the data of the replicated volume as a replication source to transfer the data to a backup destination (e.g., Japanese Laid-Open Patent Application 2002-41345, hereinafter referred to as Patent Document 2). This technique enables fast backup without burdening the on-line process.

These conventional methods have the following problems.

In a conventional technique as disclosed in Patent Document 2, in light of the volume replication technique for storage, the process of the backup server is triggered by the termination of replication. Thus a functionally different process is triggered by the change of status of the volume. However, continuous execution of these processes is assumed. No reference is made to any influence on replicated volumes that might be operated by another manager having a task other than backup, that is, to the manager's operation authority over the volumes. In a series of backup processes as disclosed in Patent Document 2, if another manager deleted any path connected with a backup server during the process of obtaining replicated volume data in a storage, the backup processes could not terminate successfully. In other words, without permission of the manager performing backup, the configuration of the volume may be arbitrarily changed by another manager. For this reason, a mechanism is required for managing authorities over volumes.

The conventional technique as disclosed in Patent Document 1 may sometimes address the above problems. However, division of the management range is a resource of the storage system including volumes. Operating a storage system involves various operations on the same volume. Such operations include, for example, setting of a path that defines a route for accessing data from a host, replication between volumes for data backup, and write protection on the volume for volume data protection. Since these operations are functionally different from the viewpoint of tasks, even a single volume may be managed by different managers for respective tasks. In this case, according to Patent Document 1, the same volume may be assigned to different managers. Therefore the same volume can be managed for each task by a different manager.

However, as disclosed in Patent Document 2, storage operations may change the status of volumes. In addition, some functions include storage operations assuming a plurality of settings for the storage operations. Such functions include, for example, replication between volumes described above. In this function, data written on a volume from a host is directly replicated to another volume within the storage, or on another storage, without the intervention of the host. However, the manager operating the replication between the volumes is only responsible for controlling the replication between the volumes and monitoring the status of volume replication on the assumption that the path has been set up. The path may be set up by another manager. This situation involves a plurality of instances of management in the same volume where, according to Patent Document 1, a management authority over paths is granted to a manager of path setup.

However, in the case of Patent Document 1, for example, even when a manager of volume replication manages the setting of replication, an authority for deleting paths of volumes is still granted to a manager of path setup. If the manager of path setup erroneously deletes a path, or creates a path to another host, then the setting of replication by the manager of volume replication becomes inoperative. More specifically, the change of path setup forces the manager of volume replication to manage volume replication under the condition that no data I/O is issued from the host, contrary to the assumption of the manager. Therefore the assumption of the manager of volume replication is violated.

SUMMARY

It is an object of the invention to provide a computer system, a managing computer, a host computer, and a volume management method being capable of regulating authorities of users and avoiding misoperations.

In order to solve the above problems, according to the invention, users, such as host managers, capable of operating volumes are regulated depending on the status (hereinafter also referred to as "attributes") of the volumes. More specifically, the operation authorities of host managers of a storage system are grasped on the basis of the status of the volumes to restrict or change the operation authorities of the different host managers over the same volume. For example, when a volume is being replicated, the status of the volume being replicated is managed. Thus, when the volume is being replicated, there is a host manager of volume replication, and other host managers, such as path setup managers, are restricted so that they do not execute path operations on the volume managed by the host manager of volume replication. In this way, path setup managers are prevented from erroneously deleting paths or creating irrelevant paths. Thus the storage system can be consistently operated and managed without corrupting the operating environment of the host manager of volume replication. That is, the operation authorities of host managers are changed depending on the status of volumes to regulate the authorities of the users and avoid misoperations. In other words, the setup authorities of the users are changed upon change of attribute of the volume, so that the settings of a storage by coexisting host managers can be made consistent without corrupting the storage operating environment.

More specifically, the invention is directed to a computer system comprising at least one storage having one or more volumes served as a storage region; a managing computer for managing the storage; and a plurality of host computers, each host computer being used by a user capable of obtaining an operation authority over the volume in the storage, where the storage, the managing computer, and the host computers being interconnected via a network, and two or more host managers being capable of using an identical volume, wherein upon obtaining an operation content of one user for at least one of the volumes over which two or more users have the operation authority, the managing computer determines from an attribute of the volume and the operation authority of the two or more users over the volume whether the operation content is executable, and when the operation content is not executable, the operation content is restrained.

According to the invention, the setup authorities of the users are changed upon change of attribute of the volume. As a result, the settings of a storage system by coexisting users can be made consistent, any misoperations by the users can be avoided, and corruption of the storage operating environment can be avoided.

BRIEF DESCRIPTION OF THE DRAWINGS

FIG. 1 shows the configuration of a storage system for managing volumes in a first embodiment.

FIG. 2 shows a first example of tables used in the storage system for managing volumes in the first embodiment.

FIG. 3 shows a second example of tables used in the storage system for managing volumes in the first embodiment.

FIG. 4 shows a third example of tables used in the storage system for managing volumes in the first embodiment.

FIG. 5 shows a fourth example of tables used in the storage system for managing volumes in the first embodiment.

FIG. 6 shows a fifth example of tables used in the storage system for managing volumes in the first embodiment.

FIG. 7 shows a sixth example of tables used in the storage system for managing volumes in the first embodiment.

FIG. 8 shows a seventh example of tables used in the storage system for managing volumes in the first embodiment.

DETAILED DESCRIPTION OF THE PREFERRED EMBODIMENTS

Figure 9:
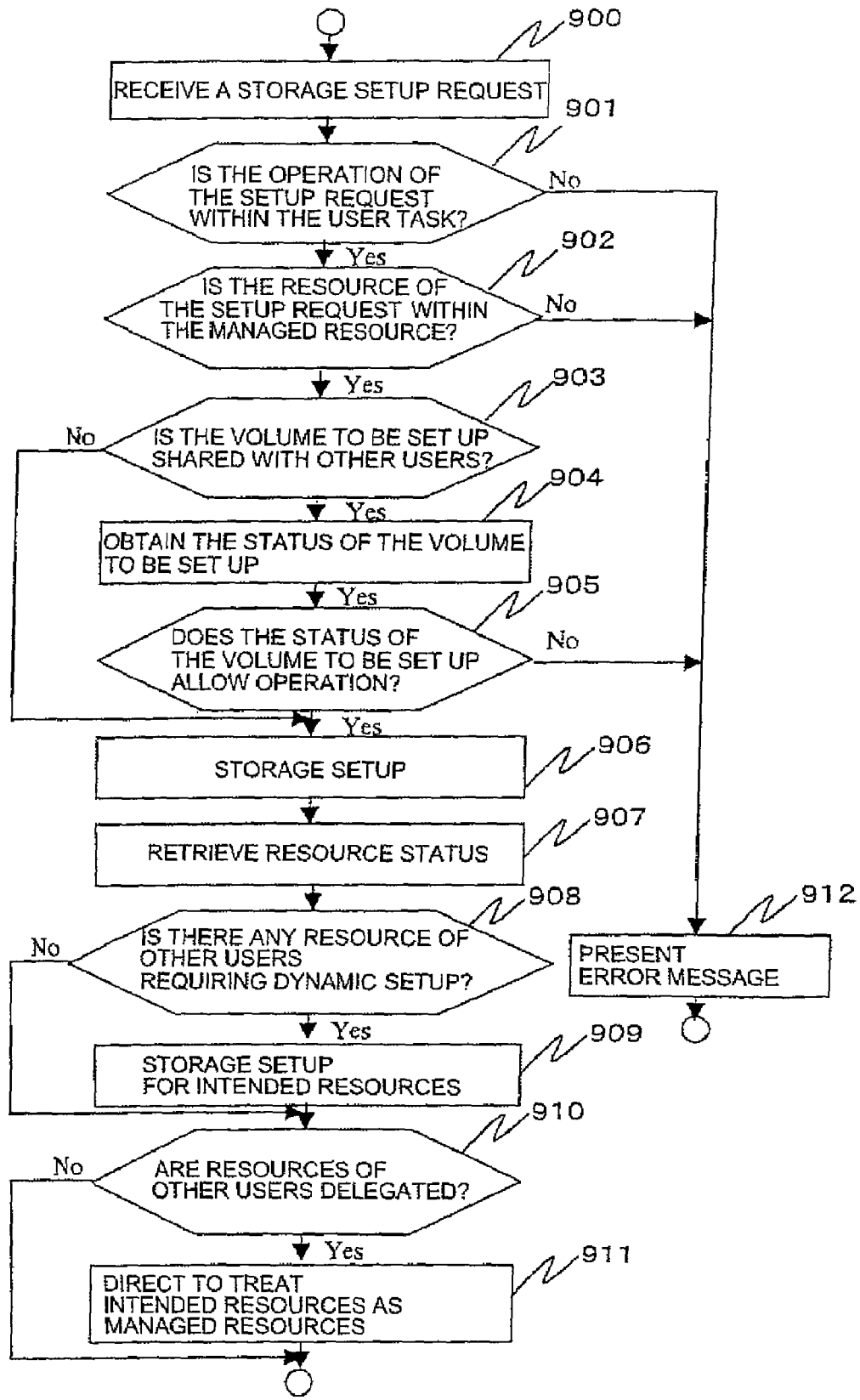
FIG. 9 shows an example flow chart illustrating a procedure of changing volume operation authorities in the first embodiment.

Preferred embodiments for carrying out the invention will now be described.

In the following, embodiments of a computer system, a managing computer, a host computer, and a volume management method according to the invention are described in detail with reference to the drawings.

First Embodiment

The first embodiment will now be described. FIG. 1 shows the configuration of a storage system for managing volumes, which is the first embodiment of a computer system of the invention. Storage 120 comprises at least one volume 125 that is a managed area for storing data actually operated by a computer (e.g., host 110), an interface (I/F) 122 for transmitting and receiving data I/O related to reading/writing the volume 125 and for communicating with a managing computer 100 and the like, a CPU 121 for actually controlling the storage, and a memory 123. The interface 122 may include separate communication devices for different forms of communication (e.g., IP (Internet Protocol) for communication with the managing computer 100 and FC (Fibre Channel) for data I/O with the host 110). The memory 123 contains a storage configuration program 124, which is embodied by being executed by the CPU 121. The storage configuration program 124 is a program for managing the configuration of the storage 120, and has storage functions including a function of using the volumes 125 to create a plurality of replicated volumes for a particular volume, a function of allowing the host 110 to recognize the volume 125 via the interface 122 (hereinafter also referred to as "path setup function"), a function of restricting hosts allowed for recognition after the path setup function is used, and a function of protecting the volume 125 from data write. The volume 125 may be a hard disk, or a logical volume of hard disks in a RAID configuration. In a backup system, the volume 125 may be a removable medium such as a tape or DVD for taking backup of data. In these cases, the storage 120 may be a medium implemented by a hard disk, a device having a plurality of hard disks to implement a volume in RAID configuration, a tape library that is a device for automatically exchanging tapes served as removable media, or a DVD library for automatically exchanging DVDs. Note that a "path" used herein refers to a path in a storage and a path between the host and the storage.

The managing computer 100 comprises a CPU 101, memory 103, and an interface 102 for communicating with the storage 120 and the host 110. Storage coordination program 104, volume authority management program 105, and host coordination program 106 for the managing computer are intended for implementing the processing of the embodiment of the invention. The storage coordination program 104, volume authority management program 105, and host coordination program 106 are stored in the memory 103 of the managing computer 100 and embodied by being executed by the CPU 101. Storage management information 107 and task management information 108 are information used in the storage coordination program 104, volume authority management program 105, and host coordination program 106.

The host 110 is a computer that transmits and receives data I/O via an interface 112 to/from the volume 125 of the storage 120, and stores and/or edits host data in the volume 125. The host 110 comprises the interface 112 described above, a CPU 111, and a memory 113. When the host 110 is managed by the managing computer 100, managing computer coordination program 116 on the memory 113 of the host 110 is used to transmit and receive information to/from the managing computer 100 via the interface 112. Task program 114 of the host 110 is a program for executing tasks operated on the host 110. These tasks (applications) include data management for updating and/or creating data on the volume 125, and backup management for replicating data. Storage coordination program 115 for the host is a program for obtaining the information and directing the settings of the storage configuration in coordination with the storage configuration program 124 of the storage 120. The task program 114, storage coordination program 115, and managing computer coordination program 116 stored in the memory 113 are embodied by being executed by the CPU 111. The interface 112, which is connected with the managing computer 100 and the storage 120, may include separate interfaces when a protocol such as TCP/IP is used for transmitting and receiving information to/from the managing computer 100 and another protocol such as Fibre Channel is used for the storage 120, that is, when they are connected using different protocols. In other words, the interface 112 may be composed of a single interface device when, for example, the same protocol is used for the managing computer 100 and the storage 120 for transmitting and receiving data of the host 110.

FIG. 2 illustrates an example set of tables in the storage management information 107 used in each program executed on the managing computer 100 in the first embodiment. The storage management information 107 includes a volume management table 200, port management table 210, and pair management table 220.

The volume management table 200 stores volume ID 201 identifying a volume, storage ID 202 identifying a storage, storage volume ID 203 identifying a volume in each storage, port ID 204 identifying a port when a path is set up, host ID 205 identifying security information used for restricting access from particular hosts when a path is set up, guard 206 storing information on whether any guard such as write protection is applied to the volume, and backup permission 207 storing information on whether the volume is intended for backup when a backup task is present. This table 200 is used for identifying volumes in a plurality of storages when the managing computer 100 manages the plurality of storages.

For example, the volume having a volume ID 201 of "VOL1" is illustrated as having a path set up at a port with a port ID 204 of "PORT-A", having a security setup so that only the host with a host ID 205 of "HOST-A" can make a reference, and being subjected to the guard described above. The volumes having no information (blank) in the port ID 204 and host ID 205 indicate that they have no path setup and security setup, respectively. For each volume, "NOT GUARDED" is stored when the above-described guard is not set up, and "GUARDED" is stored when the guard is set up. In addition, for each volume, "NOT PERMITTED" is stored when the above-described backup permission is absent, and "PERMITTED" is stored when the backup permission is present.

The host ID 205 is an identifier of a host that can be identified in a storage. Therefore, for example, if the interface 122 of the storage 120 is Fibre Channel, its World Wide Name can be used as an identifier. The information of the host ID 205 may be sent from the managing computer coordination program 116 of the host 110 to the host coordination program 106 of the managing computer 100 to determine the validity of the data of the host ID 205.

When a plurality of paths need to be set up for a single volume ID, that is, when a plurality of ports need to be registered, information having the same volume ID may be stored in a different rows in the volume management table 200. In addition, when security is applied to a plurality of hosts for the same path, that is, for the same set of volume ID and port ID, a plurality of instances of this path with different host IDs may be stored in the volume management table 200.

There may be a plurality of types of guard 206 (e.g., write protect only, read/write protect, etc.). However, for simplicity, it is assumed herein that the guard is set up by a common manager, and the embodiment is described with reference to the identification of whether the guard is set up.

The port management table 210 stores port ID 211 identifying a port, storage ID 212 identifying a storage, and storage port ID 213 identifying a port in each storage. This table is used for identifying ports in a plurality of storages when the managing computer 100 manages the plurality of storages.

The pair management table 220 stores pair ID 221 identifying each pair relation, replication source 222 indicating the volume ID of a replication source, replication destination 223 indicating the volume ID of a replication destination, and status 224 indicating a pair status. The information of the replication source 222 and the replication destination 223, which has the same value as the volume ID 201 in the volume management table 200, stores the pair relation between the volumes. For example, the pair having pair ID "1" represents a pair relation from the volume "VOL1" of the replication source to the volume "VOL2" of the replication destination, and a pair status of pairing, that is, a status indicating that data is being copied from the replication source to the replication destination.

It is assumed here that the status 224 in the pair management table 220 can have the following types of pair status. Status "PAIRING" indicates that, as described above, data in the volume of the replication source is being written to the replication destination volume for synchronization of data, or they are actually in synchronization. Status "PAIR SPLIT" indicates that data copy from the replication source volume to the replication destination volume is suspended in order to save data within a certain time period after the data is synchronized during pairing. The status thus indicates that the data in the replication source volume within a time period of pair split is also reflected in the replication destination volume. Status "NOT PAIRED" refers to the status of a volume that is not involved in pair definition.

FIG. 3 illustrates an example set of tables in the task management information 108 used in each program executed on the managing computer 100 in the first embodiment of the invention. Task operation table 300 stores information including task 301 representing the name of a user task and operation 302 indicating the storage operation actually executed by the task 301. The operation "PAIR" indicated here refers to an operation of replicating a volume, and the operation "PATH" refers to an operation of path setup.

For example, the task "STORAGE" indicates that pair and path operations are executed in a storage setup that can be executed by the storage configuration program 124. While the guard setup described below can also be executed by the storage configuration program 124, the guard setup is excluded from this storage task because another host manager is assigned.

The task "BACKUP" refers to a task on a backup server providing a host with a backup task to execute replication from the volume of replication source to the volume of replication destination. However, it indicates that the actual storage operation is executed as a path operation for the backup server and the volume.

The task "GUARD SETUP" is a task of guard setup in coordination with the task program and the storage coordination program located in the host. It indicates that a guard setup operation is executed for the storage operation.

User management table 310 stores user ID 311 identifying a user, task 312 indicating a task of the user, managed resource 313 that is a set of resources managed by the user in the task 312, and password 314 of the user.

The information stored in the managed resource 313 includes volumes and the like that are also indicated in the volume ID 201, port ID 211, and host ID 205.

For example, a user having a user ID 311 of "1" is illustrated as having a task of storage operation, and being able to manage resources including volumes "VOL1" and "VOL2", ports "PORT-A" and "PORT-A1", and hosts "HOST-A" and "HOST-B".

A user having a user ID 311 of "2" is illustrated as having a task of backup, and being able to manage resources including volumes "VOL2" and "VOL7", ports "PORT-A1" and "PORT-C", and host "HOST-B".

A user having a user ID 311 of "3" is illustrated as having a task of guard setup, and being able to manage resources including volume "VOL1" and host "HOST-A".

FIG. 4 illustrates another example set of tables in the task management information 108 used in each program executed on the managing computer 100 in the first embodiment. Task operation table 400 has the same form as the task operation table 300, but indicates tasks in a different representation. The tasks in this representation can also be viewed as a form of tasks obtained by dividing the task "STORAGE" in the task operation table 300 into individual operations and managing each operation by a separately assigned host manager.

The task operation table 400 stores information including task 401 representing the name of a user task and operation 402 indicating the storage operation actually executed by the task 401. For example, the task "PATH" indicates that path operations are executed in a storage setup that can be executed by the storage configuration program 124. The task "PAIR" indicates that pair operations are executed in a storage setup that can be executed by the storage configuration program 124.

User management table 410 has the same form as the user management table 310, but represents an example of defining users in a different management system.

The user management table 410 stores user ID 411 identifying a user, task 412 indicating a task of the user, managed resource 413 that is a set of resources managed by the user, and password 414 of the user.

The information stored in the managed resource includes volumes and the like that are also indicated in the volume ID 201, port ID 211, and host ID 205.

For example, a user having a user ID 411 of "11" is illustrated as having a task of path operation, and being able to manage resources including volumes "VOL1", "VOL2", "VOL5", and "VOL6", ports "PORT-A" and "PORT-B", and hosts "HOST-A" and "HOST-B". It thus indicates that the user can set up a path with "VOL1" and "PORT-A", and another path with "VOL5" and "PORT-B".

A user having a user ID 411 of "12" is illustrated as being able to set up a pair using volumes "VOL1" and "VOL5", and another pair using "HOST-A" and "HOST-C" via the host 110. Here, the pair setup via the host 110 requires that the user having a user ID 411 of "11" cause "HOST-A" to set up paths for "VOL1" and "VOL5", respectively.

FIG. 5 illustrates an example table in the task management information 108 used in each program executed on the managing computer 100 in the first embodiment. Shared volume operation management table 500 is a table for use with a volume shared by a plurality of users to associate the status of the volume with tasks that can use the volume. It is assumed that the tasks indicated here are those examples indicated in the task operation table 300 and the user management table 310 shown in FIG. 3.

The shared volume operation management table 500 stores information including operation 501 representing an operation content for the volume shared by a plurality of users, volume status 502 defined as information for distinguishing volume operations, task 503 indicating the task of a user authorized for the operation of the shared volume, dynamic setup 504 indicating whether the operation 501 on the shared volume is set up on the occasion of change of status to the volume status 502, and resource delegation 505 defined with respect to the delegation of the authority over the resource used in the operation on the shared volume.

The volume status 502 indicates guard 206 and backup permission 207 in the volume management table 200 and status 224 in the pair management table 220 of the storage management information 107. Absence of information stored in this volume status 502 indicates that the volume operation is allowed irrespective of the volume status.

The task 503 is information on the task in the user management table 310 and the task operation table 300. The example shown in FIG. 5 includes an entry where no information is stored in the task 503. This means that the operation authority is not granted to users of any task.

The dynamic setup 504 may store a value (information) of "YES". The value "YES" being stored indicates that, when the volume gets into the status indicated in the volume status 502, the operation 501 to be executed in the task 503, if it has not been set up yet, is automatically set up without the intervention of user operation. Absence of information stored in the dynamic setup 504 indicates that the above process of dynamic setup is not to be executed.

The resource delegation 505 may store a value (information) of "YES". The value "YES" being stored indicates that, when the volume gets into the status indicated in the volume status 502, the managed resources associated with the shared volume of the user managing the resources before getting into the volume status 502 are delegated.

For example, the operation "PATH" normally has a task 503 "STORAGE" or "BACKUP" in view of the example shown in FIG. 3. However, when the volume status 502 is "GUARDED", that is, when the shared volume is subjected to guard setup, the user task capable of using the volume is changed to the task 503 "GUARD SETUP". At this time, the resources associated with the shared volume used for a normally managed task and with the operation "PATH" for the shared volume are delegated to the task 503 "GUARD SETUP". That is, a normally managed user task is assigned to "GUARD SETUP". This defines a consistent execution of tasks by using the volume status to change the users of the task capable of storage operation, that is, to change the storage operation authority of the users.

Users executing each task may have various levels. For example, some users may have a high level of operation authority in guard setup. Other users may have a low level of operation authority so that they can execute guard setup only on a certain occasion (e.g., they can execute guard setup only on pair split). In this case, a plurality of instances of the task specified in the task 503 are set up and ranked. For example, suppose that user A is responsible for the guard setup task, user B is responsible for the storage task, both users having a high level of operation authority, and user C is responsible for the guard setup task and has a low level of operation authority. In the pair operation with the status of "GUARDED", users of the guard setup task have the authority. For the three users described above, users A, B, and C are registered on the task 503 so that the operation authority is granted to users A, B, and C in this order (priority). In this way, if there are no users at the level of user A and only the users at the level of users B and C are managing the shared volume, then the users at the level of users B, that is, the users of the storage task, will execute the pair operation even in the status of "GUARDED".

It may also occur that users at the same level execute the same task and manage the same volume. In this case, the user executing the task earlier is set to have the right to managed resources and finishes the operation of the task. For example, in the pair operation of setting up a pair by a user, the task 503 may be registered so that the user has the operation authority over the associated volumes and that the other users at the same level are excluded from the operation authority. Otherwise, without this limitation, any users at the same level may be treated as being capable of the operation.

FIG. 6 illustrates an example table indicating which particular user can operate the volume shared by various users, where the particular user is determined from the volume status based on the information in the task operation table 300, user management table 310, and shared volume operation management table 500 in the first embodiment.

Shared volume operation management correspondence table 600 indicates information including shared volume 601 indicating the volume ID of a volume shared by the users, operation 602 representing an operation content for the volume shared by a plurality of users, volume status 603 defined as information for distinguishing volume operations, allowed user 604 indicating a user that can execute the operation 602 on the shared volume 601 in the case of the volume status 603, dynamic setup 605 indicating whether the operation 602 on the shared volume is set up on the occasion of change of status to the volume status 603, and resource delegation 606 defined with respect to the delegation of the operation authority over the resource used in the operation on the shared volume. The dynamic setup 605 and resource delegation 606 have the same meaning as the dynamic setup 504 and resource delegation 505 in the shared volume operation management table 500 described above.

Absence of a value (information) stored in the volume status 603 indicates that the volume operation is allowed irrespective of the volume status. For example, the guard setup for "VOL1" indicates that the guard operation can be executed by the user having user ID "3" irrespective of the status of the volume.

Absence of a value stored in the allowed user 604 indicates that no user has the operation authority indicated in the operation 602. For example, it can be seen in the volume "VOL2" that the allowed user 604 has no value in the case of "PAIR SPLIT, BACKUP PERMITTED". In this case, no user has the authority over the operation indicated in the operation 602, that is, pair operation.

The shared volume operation management correspondence table 600 may have information automatically created from the shared volume operation management table 500, user management table 310, and task operation table 300. Alternatively, the information may be registered as the task management information 108 of the managing computer prior to the storage operation. The shared volume operation management table 500 and the shared volume operation management correspondence table 600 may be prevented from coexisting. Alternatively, if they coexist, determination may be made as to which table is preferred.

For example, the shared volumes are "VOL1" and "VOL2". If the volume status of "VOL1" is "GUARDED", then the user capable of using the shared volume in the path operation is found to be "3", that is, a user of the guard setup task according to the user management table 310. In addition, the resource delegation 606 indicates "YES". Therefore, in this case, resources such as ports and hosts required for the path operation on "VOL1" are also delegated to the user having user ID "3" responsible for guard setup, who will execute the path operation on behalf of the user having user ID "1".

The volume status 603 in the shared volume operation management correspondence table 600 needs to store only the status for the operation by the sharing users. That is, "VOL1" is shared only by the user having user ID "1" and the user having user ID "3", and does not depend on the pair status, so that it does not need to store information on the pair status.

FIG. 7 illustrates an example table in the task management information 108 used in each program executed on the managing computer 100 in the first embodiment. Shared volume operation management table 700, which has the same form as the shared volume operation management table 500, is a table for use with a volume shared by a plurality of users to associate the status of the volume with tasks that can use the volume. It is assumed that the tasks are those examples indicated in the task operation table 400 and the user management table 410 shown in FIG. 4.

The shared volume operation management table 700 stores information including operation 701 representing an operation on the volume shared by a plurality of users, volume status 702 defined as information for distinguishing volume operations, task 703 indicating the task of a user authorized for the operation of the shared volume, dynamic setup 704 indicating whether the operation 701 on the shared volume is set up on the occasion of change of status to the volume status 702, and resource delegation 705 defined with respect to the delegation of the operation authority over the resource used in the operation on the shared volume.

For example, in the operation "PATH", the volume status 702 of "NOT PAIRED" indicates that the user of the task "PATH" executes the operation. If the volume status 702 is "PAIRED", the user of the task "PAIR" executes the operation, and the resource delegation 705 is set to "YES".

FIG. 8 illustrates an example indicating which particular user can operate the volume shared by various users, where the particular user is determined from the volume status based on the information in the task operation table 400, user management table 410, and shared volume operation management table 700 in the first embodiment.

Shared volume operation management correspondence table 800, which has the same form as the shared volume operation management correspondence table 600, indicates information including shared volume 801 indicating the volume ID of a volume shared by the users, operation 802 representing an operation content for the volume shared by a plurality of users, volume status 803 defined as information for distinguishing volume operations, allowed user 804 indicating a user that can execute the operation 802 on the shared volume 801 in the case of the volume status 803, dynamic setup 805 indicating whether the operation 802 on the shared volume is set up on the occasion of change of status to the volume status 803, and resource delegation 806 defined with respect to the delegation of the operation authority over the resource used in the operation on the shared volume. The dynamic setup 805 and resource delegation 806 have the same meaning as the dynamic setup 704 and resource delegation 705 in the shared volume operation management table 700 described above.

In the same light as the shared volume operation management correspondence table 600, the shared volume operation management correspondence table 800 may have information automatically created from the shared volume operation management table 700, user management table 410, and task operation table 400. Alternatively, the information may be registered as the task management information 108 of the managing computer prior to the storage operation. The shared volume operation management table 700 and the shared volume operation management correspondence table 800 may be prevented from coexisting. Alternatively, if they coexist, determination may be made as to which table is preferred.

For example, the shared resources (volumes) 801 are "VOL1" and "VOL5". If the volume status of "VOL1" is "PAIRED", then the user capable of using the shared volume in the path operation is found to be "12", that is, a user of the pair task. In addition, the resource delegation 806 indicates "YES". Therefore, in this case, resources such as ports and hosts required for the path operation on "VOL1" are also delegated to the user having user ID "12" responsible for the pair task, who will execute the path operation on behalf of the user having user ID "11".

FIG. 9 shows an example flow chart illustrating a procedure of changing volume operation authorities by a user of a volume on the managing computer in the first embodiment. In FIG. 9, steps 906 and 909 are executed by the storage coordination program 104, and the other steps are executed by the volume authority management program 105. In addition, at steps 906 and 909, the storage setup may be executed via a host. In this case, it may be executed by also directing the host coordination program 106.

The managing computer 100 receives a storage setup request from a user (step 900). The received request includes a user ID, password, resource to be used, and requested operation. Here, if the requesting user or the password of the user is inconsistent with the information in the user management table, it is treated as an error and the process is terminated. At this time the cause of the error may be presented to the operator of the storage setup.

Next, based on the request received at step 900, it is determined whether the operation of the received storage setup request is within the user task (step 901). That is, referring to the table in FIG. 3 by way of example, it is determined whether the user task in the user management table 310 corresponds to the operation specified in the task operation table 300. If the operation is within the user task, the process continues to step 902. Otherwise, the process continues to step 912, where an error message indicating that the operation is out of the user task is communicated to the user and the process is terminated.

For example, suppose a case where a user having a user ID 311 of "2" in the user management table 310 requests a pair operation. The task of the user having a user ID 311 of "2" in the user management table 310 is the backup task. According to the task operation table 310, it can be seen that only the path operation is permitted as the backup task. Therefore, it is determined that execution of the pair operation by a user having user ID "2" is out of the user task. The process then continues to step 912, where an error message indicating that the pair operation is out of the user task is communicated to the user and the process is terminated. In this case, if the requested operation for the user is a path operation, it is within the user task for a user having user ID "2". Therefore the process continues to step 902.

At step 902, based on the request received at step 900, it is determined whether the received storage setup request is within the managed resource. If the request is within the managed resource, the process continues to step 903. Otherwise, the process continues to step 912, where an error message indicating that the request is out of the managed resource is communicated to the user and the process is terminated.

For example, suppose a case where a user having a user ID 311 of "1" in the user management table 310 tries to set up a path using the port "PORT-A" and volume "VOL3". "VOL3" is not registered at the managed resource 313 of the user having a user ID 311 of "1" in the user management table 310. Therefore the process continues to step 912, where an error message indicating that "VOL3" is out of the managed resource is communicated to the user and the process is terminated. In this case, if the volume "VOL2" rather than the volume "VOL3" is requested, it is within the managed resource for a user having user ID "1". Therefore the process continues to step 903.

At step 903, it is determined whether the volume requested at step 900 is shared with other users, that is, whether it is managed by other users with the same volume being served as the managed resource. If it is shared, the process continues to step 904. Otherwise, the process continues to step 906.

For example, if a user having a user ID 311 of "1" in the user management table 310 requests at step 900 for a path operation on "VOL2", it is found that the user having a user ID 311 of "2" also has "VOL2" as the managed resource. Therefore, in this case, the process continues to step 904.

At step 904, the status of the volume requested at step 900 is obtained.

For example, referring to the data of the volume management table 200 and pair management table 220 in FIG. 2 by way of example, if the volume intended for setup is "VOL2", the status of "VOL2" is determined to be "NOT GUARDED" from guard 206 in the volume management table 200 and "PAIRING" from status 224 in the pair management table 220. The process then continues to step 905.

At step 905, the possibility of operating the volume requested at step 900 depends on the volume status obtained at step 904. The possibility of storage setup, which depends on the status of the volume, is determined by comparing the volume status and the volume operation authority in the shared volume operation management table and the tables in the storage configuration information 107. If the storage setup is possible, the process continues to step 906. Otherwise, the storage setup is not possible and the process continues to step 912, where an error message thereof is presented to the storage setup requester and the process is terminated.

For example, if the storage setup requester is the user having user ID "2" in the user management table 310, the requested operation is the path operation, and the volume to be used is "VOL2", then the status of "VOL2" is found to be "NOT GUARDED" and "PAIRING". In addition, it is determined from the shared volume operation management table 500 that the volume is associated with a user of the storage task. The user having user ID "2" is a backup user, and thus has no authority for operation in this volume status. That is, the user having user ID "2" cannot execute path operations on "VOL2". Therefore the process continues to step 912, where an error message is presented indicating lack of authority for the requested operation in light of the volume status at the time of the request and the process is terminated. At this time, if the user has user ID "1" instead of "2", the user has the operation authority, and the process will continue to step 906, because the user having user ID "1" is responsible for the storage task according to the user management table 310.

In addition, for example, if the storage setup requester is the user having user ID "11" in the user management table 410, the requested operation is the path operation, and the volume to be used is "VOL5", then the status of "VOL5" is found to be "NOT GUARDED" and "PAIRING". In addition, it is determined from the shared volume operation management table 700 that the volume is associated with a user of the path task, and thus the user has no authority for operation in this volume status. That is, the user having user ID "11" cannot execute path operations on "VOL5". Therefore the process continues to step 912, where an error message is presented indicating lack of authority for the requested operation in light of the volume status at the time of the request and the process is terminated. At this time, if the user has user ID "12", the user has the operation authority, and the process will continue to step 906, because the user having user ID "12" is responsible for the pair task according to the user management table 410.

At step 906, the storage setup associated with the request received at step 900 is executed by directing the storage configuration program 124 of the storage 120 from the storage coordination program 104. The process then continues to step 907.

According to the process so far, the volume operation authority can be consistently granted in response to the request of the user. Influence of the operation by other users can be excluded, and misoperations in the volume operation can be avoided. That is, the system environment of the volume operation can avoid corruption.

At step 907, after the completion of step 906, that is, after the requested storage setup is completed, the status of the volume is obtained again. At this time, the pair and guard operations may change the volume status, which should be confirmed as with step 907. This step may be omitted for the path operation that involves no change of the volume status. However, the process of step 907 may be required for a path operation that manages the volume status such as the status of "PATH" or "NO PATH", which affects the shared volume operation. After the process of step 907 is completed, the process continues to step 908.

For example, suppose that a user having user ID "1" in the user management table 310 executes an operation of changing the status "PAIRING" of the pair of "VOL1" and "VOL2" indicated in the pair management table 220 to the status "PAIR SPLIT". In this case, the pair operation at step 906 changes the status of the pair of "VOL1" and "VOL2" to "PAIR SPLIT". This status is obtained at step 907. The guard status is not changed and remains to be "NOT GUARDED". The process then continues to step 908.

At step 908, it is determined whether there is any resource of other users that requires dynamic setup, that is, whether any task of other users includes an operation having "YES" in dynamic setup 504 of the shared volume operation management table 500. If there is any volume of other users that has "YES" in dynamic setup 504, the process continues to step 909. Otherwise, the process continues to step 910.

For example, suppose that a user having user ID "1" in the user management table 310 executes an operation of changing the status "PAIRING" of the pair of "VOL1" and "VOL2" indicated in the pair management table 220 to the status "PAIR SPLIT". In this case, the pair operation at step 906 changes the status of the pair of "VOL1" and "VOL2" to "PAIR SPLIT". Suppose further that backup permission is granted to the volume of the replication destination simultaneously with the above pair operation. That is, suppose that in a backup process, a backup server (host) is used to transfer data of the replication destination volume to the volume of the backup destination. In this case, "VOL2" is the replication destination volume of the pair operation, and has a status of "BACKUP PERMITTED". This status is obtained at step 907. The guard status is not changed and remains to be "NOT GUARDED".

In this case, "VOL2" is shared with the user having user ID "2" in the user management table 310 and being responsible for the backup task. In addition, it is determined from the shared volume operation management table 500 that dynamic setup 504 has a value of "YES" in the backup task having the status of "PAIR SPLIT" and "BACKUP PERMITTED". At this time in the process, the operation by the user of the backup task is automatically executed. Therefore, in this case, the process continues to step 909.

At step 909, storage setup is executed on the resources intended for dynamic setup. After the storage setup is completed, the process continues to step 910.

For example, referring to the example at step 908, the volume "VOL2" served as a shared volume is subjected to dynamic setup for the path operation, where a path is set up for port "PORT-A1" and host "HOST-B" to be connected with "VOL2". If this path has already been set up, it is not necessary to execute this setup, and confirmation of this path may be executed. Here, a path operation may imply path setup between a port and a volume in the storage. Alternatively, in order to actually execute the backup process by a host, a series of processes starting from the above-described path setup until a volume is mounted from the host may be defined as a path setup, and its path environment may be constructed. If a volume of replication destination is mounted during pairing, there is a danger that data is written into the volume of replication destination, which may cause difficulty in synchronizing data between the volume of replication source and the volume of replication destination. For this reason, the processes up to mounting may be executed in the backup task.

In the above process, the definition of a path for "VOL2" can be uniquely derived from the managed resource of the user having user ID "2". However, there may be a plurality of options depending on the assignment of managed resources. The options may include a setting that should be actually set up and another setting that should not be set up. In this case, a path to be set up may be predetermined for each shared resource.

At step 910, it is determined whether resources of other users are delegated, that is, whether resources associated with the volume shared with other users are delegated according to the status of the volume, or in other words, whether there is any operation having resource delegation 505 (705) of "YES" in the shared volume operation management table 500 (700) in the task of other users. If there is any resource delegation, the process continues to step 911. Otherwise, the process is terminated.

For example, guard setup executed on the managed resource "VOL1" by the user having user ID "3" in the user management table 310 changes the status of "VOL1" to "GUARDED". At this time, in the shared volume operation management table 500, resource delegation 505 is "YES" for "GUARDED" path and pair operations. This means that the resources of the user having user ID "1" responsible for tasks for operating paths or pairs in "VOL1", that is, storage tasks in this case, are delegated. Therefore, in this case, the process continues to step 911.

In addition, for example, pair setup executed on the managed resource "VOL1" by the user having user ID "12" in the user management table 410 changes the status of "VOL1" to "PAIRING". At this time, in the shared volume operation management table 700, resource delegation 705 is "YES" for "PAIRING" or "PAIRED" path operation. This means that the resources of the user having user ID "11" responsible for tasks for operating paths in "VOL1", that is, path tasks in this case, are delegated. Therefore, in this case, the process continues to step 911.

At step 911, it is directed that the resources intended for delegation be treated as managed resources of the delegate user. The process is then terminated.

For example, referring to the example at step 910, the volume "VOL1" owned by user ID "1" and shared with user ID "3", as well as the resources of volumes, ports, and hosts used by paths and pairs already set up in the storage task, are delegated. This status is maintained by the managing server, which responds to the delegate user by directing the user to treat the resources as managed resources.

In addition, for example, referring again to the example at step 910, the volume "VOL1" owned by user ID "11" and shared with user ID "12", as well as the resources of volumes, ports, and hosts used by paths already set up in the storage task, are delegated. This status is maintained by the managing server, which responds to the delegate user by directing the user to treat the resources as managed resources.

Accordingly, in the shared volume subjected to guard setup, the operation authority over the volume having guard setup is delegated to a user of the guard task, and operations by other users can be excluded.

At step 912, a process of returning the cause of the error as an error message is carried out in order to communicate the error to the user.

In this way, the volume operation authority of other users can be coordinated in response to the request of a user. Influence of the operation by other users can be excluded, and misoperations in the volume operation can be avoided. That is, the system environment of the volume operation can avoid corruption.

Moreover, volume operations may include operations executed from the storage coordination program 104 of the managing computer 100 and operations executed from the storage coordination program 115 of the host 110, where some of the operations may be in common. In this case, if one storage coordination program operates on a volume while the other storage coordination program operates on the same volume, these volume operations will lose consistency. In such a case, when one storage coordination program is operating, the operation authority of the other storage coordination program can be coordinated to inhibit its operation.

Furthermore, the volumes having the status "NOT PAIRED" for pair operation may include volumes that have never been involved in creation of a pair and volumes that have been involved in pair setup followed by pair deletion. Depending on the implementation, these two types of volumes may be separated. For example, if a user of the backup task at the managing computer distinguishes the "NOT PAIRED" status in which pair setup is followed by pair deletion, the backup data can still be read out of the associated volume, and thus the operation on the volume may be allowed. If the volume has a status of "PAIRING" again, it will be treated as having no authority.

As with the path setup process, the function of limiting hosts capable of using the path (hereinafter referred to as "path security function") is also delegated in the same manner as delegation of the path setup operation, thereby achieving consistency of the volume operation.

Various programs and information in the managing computer 100 may be contained either in the storage 120 or in the host 110.

Figure 10:
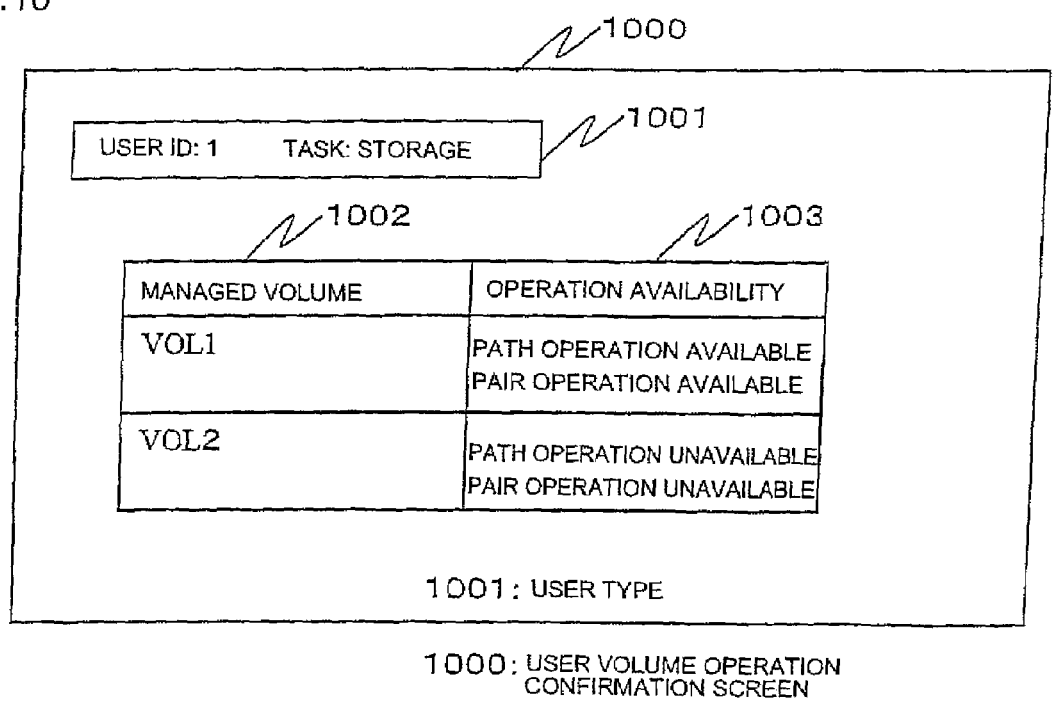
FIG. 10 shows an example of displaying volume operation authorities in the first embodiment.

FIG. 10 is an example illustrating a display screen that displays to a user the volumes managed by the user that allow operation.

User volume operation confirmation screen 1000 provides display items including user type 1001, managed volume 1002 displaying the volume managed by the user, and operation availability 1003 indicating whether the volume managed by the user allows operation.

The user type displays a user and a task stored in the user management table 310 or 410. It provides display for each user when the user presents a display request to the managing computer.

The managed volume 1002 is directed to the volumes of the managed resources stored in the user management table 310 or 410.

The operation availability 1003 indicates whether the intended operation is available for the managed volume 1002.

For example, as already illustrated in the example of FIG. 9, the user having user ID "1" is responsible for the storage task and executes the path and pair operations. However, if there is any volume shared with other users, the path or pair operation for executing the storage task may be prohibited depending on the status of the volume, so that the operation availability of the shared volume may be "PATH OPERATION UNAVAILABLE" or "PAIR OPERATION UNAVAILABLE". For example, as already illustrated in the example of FIG. 9, "VOL2" is shared with the user having user ID "2" responsible for the backup task. In this case, if the status of the volume is "PAIR SPLIT, BACKUP PERMITTED, NOT GUARDED", then it is determined from the shared volume operation management table 500 that the user having user ID "1" is responsible for the storage task and has no operation authority over path and pair operations. Therefore, in this case, "PATH OPERATION UNAVAILABLE" and "PAIR OPERATION UNAVAILABLE" are displayed.

The above-described user volume operation confirmation screen 1000 may be displayed to each user so that it can be determined whether the operation authority of each user is available.

In the user volume operation confirmation screen, the managed volume 1002 may display the indication of the shared volume. The operation availability may be displayed only for shared volumes. The status of the volume may also be shown.

Second Embodiment

Figure 11:
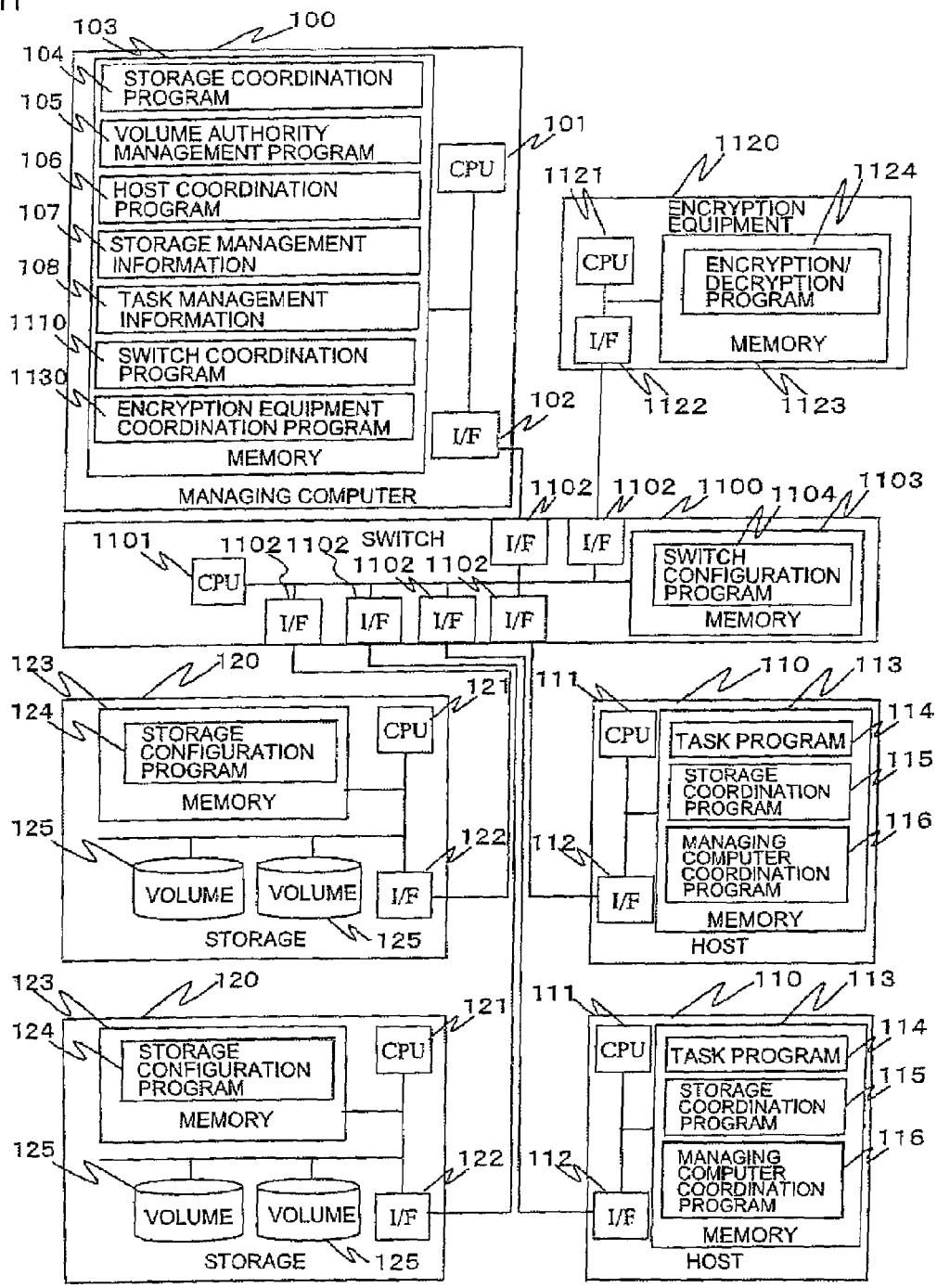
FIG. 11 shows the configuration of a storage system for managing volumes in a second embodiment.

The second embodiment will now be described. FIG. 11 shows the configuration of a computer system in the second embodiment of the invention. A switch 1100 is added to the computer system of the first embodiment shown in FIG. 1. The switch 1100 is connected with the storages 120, hosts 110, and managing computer 100 for passing data among them. The switch 1100 comprises interfaces (I/F) 1102 for communicating with the storage 120, host 110, managing computer 100, and the like, a CPU 1101 for actually controlling the switch, and a memory 1103. The interfaces 1102 may include separate communication devices for different forms of communication (e.g., IP (Internet Protocol) for communication with the managing computer and FC (Fibre Channel) for data I/O). The memory 1103 contains a switch configuration program 1104, which is embodied by being executed by the CPU 1101. The switch configuration program 1104 is a program for managing the configuration of the switch 1100, and has a function of determining which of the interfaces 1102 to use for communication (hereinafter referred to as "switch path setup function") and the like.

The managing computer 100 further includes a switch coordination program 1110 for coordinating with the switch 1100. The switch coordination program 1110 is used to obtain information and issue a setup request.

In view of the presence of control by the switch 1100, the path operation for the storage should be executed with the switch path setup function of the switch 1100 taken into consideration. That is, when the host 110 writes data into the volume 125 of the storage 120, the data I/O flows via the switch 1100. Therefore the managing computer 100 needs to direct the switch configuration program 1104 of the switch 1100 via the switch coordination program 1110 to ensure a data path so that data can flow between the host 110 and the storage 120.

In addition, as described above, depending on the task, the authority for path setup may need to be delegated by the user of another task. In this case, the operation authority over the switch as well as the operation authority of the path setup for the storage should be delegated. However, since the path of the switch may be shared, confirmation of the authority rather than delegation thereof may be executed in the path task.

Moreover, encryption equipment 1120 is added to the computer system shown in FIG. 1. The encryption equipment is connected with the storages 120, hosts 110, and managing computer 100, although via the switch 1100. The encryption equipment has a function of encrypting data to be written into the volume 125 of the storage 120 by the host 110 and decrypting data so that the host 110 can normally view it. The encryption equipment 1120 comprises an interface 1122 for communicating with the storage 120, host 110, managing computer 100, and the like, a CPU 1121 for actually controlling encryption and decryption, and a memory 1123. The interface 1122 may include separate communication devices for different forms of communication (e.g., IP (Internet Protocol) for communication with the managing computer and FC (Fibre Channel) for data I/O). The memory 1123 contains an encryption/decryption program 1124, which is embodied by being executed by the CPU 1121. The encryption/decryption program 1124 is a program for encrypting and decrypting data.

The managing computer 100 further includes an encryption equipment coordination program 1130 for coordinating with the encryption equipment 1120. The encryption equipment coordination program 1130 is used to obtain information and issue a setup request.

In view of the presence of control by the encryption equipment 1120, data may be encrypted in the volume 125 of the storage 120. When the encrypted volume is shared by a plurality of users, the user that executed the encryption may be allowed to manage the shared volume to avoid misoperation by the other users. In this case, a certain definition similar to the guard setup may be provided in the shared volume operation management table 500.

In this way, both in a storage configuration including a switch and in a storage configuration including encryption equipment, the volume operation authority of other users can be coordinated in response to the request of a user. Influence of the operation by other users can be excluded, and misoperations in the volume operation can be avoided. That is, the system environment of the volume operation can avoid corruption.

The invention has been described with reference to the embodiments. In an aspect of the computer system of the invention, upon obtaining the operation content of one user for at least one of the volumes over which two or more users have the operation authority, the managing computer determines from the attribute of the volume and the operation authority of the two or more users over the volume whether the operation content is executable, and when the operation content is executable, the operation authority of the other users over the volume is changed depending on the attribute of the volume.

In another aspect of the computer system of the invention, when the managing computer determines whether the operation content for the volume is executable, the host computer used by the one user displays whether the operation on the volume is available.

In still another aspect of the computer system of the invention, when one user executes an operation on at least one of the volumes over which two or more users have the operation authority, the managing computer obtains the attribute of the volume after the execution of the volume operation and, according to the obtained attribute of the volume, determines whether the volume operation of other users is to be executed, and when there is no setup for the volume operation of the one user, the volume operation of the other users is executed.

In still another aspect of the computer system of the invention, when one user executes an operation on at least one of the volumes over which two or more users have the operation authority, the managing computer obtains the attribute of the volume after the execution of the volume operation and, according to the obtained attribute of the volume, delegates the operation authority of other users over the at least one volume to the one user.

In still another aspect of the computer system of the invention, the managing computer treats a process of causing the host computer controlling the volume to recognize the volume as being covered by the operation authority of the user.

In still another aspect of the computer system of the invention, the managing computer selects a replication source volume and a replication destination volume from a plurality of volumes, and treats a process of replication from the replication source volume to the replication destination volume as being covered by the operation authority of the user and treats a status of the replication process as the attribute of the volume.

In still another aspect of the computer system of the invention, the managing computer treats a process of write protection or read protection of the volume from the computer controlling the volume as being covered by the operation authority of the user and treats a status of the write protection or the read protection as the attribute of the volume.

In still another aspect of the computer system of the invention, the managing computer treats a process of encrypting data in the volume as being covered by the operation authority of the user and treats a status of the data in the volume being encrypted as the attribute of the volume.

In still another aspect of the computer system of the invention, the managing computer has a memory storing a storage coordination program, a volume authority management program, a host coordination program, storage management information, and task management information including a task operation table and a user management table, the host computer has a memory storing a task program, a storage coordination program, and a managing computer coordination program, the storage has a memory storing a storage configuration program, and the managing computer is operative for: using the task operation table and the user management table to determine whether a storage setup request received from the user is within the task and a managed resource of the user, and whether the pertinent volume is shared with other users; when the request is within the task and managed resource of the user but the volume is shared with the other users, determining whether the volume to be set up allows operation in the status of the volume; when the operation is allowed, executing storage setup associated with the storage setup request received from the user; obtaining the status of the managed resource again; determining whether need for dynamic setup for the other users exists; when the need exists, executing storage setup for the resource intended for the dynamic setup; determining whether the resource of other users is delegated; and when the resource of the other users is delegated, directing the intended resource to be treated as the managed resource.

The invention is also directed to a managing computer for managing at least one storage having one or more volumes served as a storage region, the storage being connected via a network, two or more users being capable of obtaining an operation authority over an identical volume, wherein upon obtaining an operation content in a host computer managed by one user for at least one of the volumes over which two or more users have the operation authority, the managing computer determines from an attribute of the volume and the operation authority of the two or more users over the volume whether the operation content is executable, and when the operation content is not executable, the operation content is restrained.

The invention is also directed to a host computer managed by a user capable of obtaining and managing an operation authority over an identical volume in a storage with other users, the storage having one or more volumes served as a storage region, wherein when the user executes an operation on the volume in the storage, and when a managing computer for managing the storage determines from an attribute of the volume and the operation authority of two or more users over the volume whether the operation content is executable, the host computer displays whether the operation on the volume is available.

The invention is also directed to a storage comprising one or more volumes served as a storage region, a plurality of users being capable of obtaining an operation authority over at least one of the volumes, wherein when a managing computer determines that an operation content of one user for at least one of the volumes over which two or more users have the operation authority is not executable from an attribute of the volume and the operation authority of the two or more users over the volume, the operation content is prevented from being executed.

The invention is also directed to a volume management method in a computer system including at least one storage having one or more volumes served as a storage region, a managing computer for managing the storage, and a plurality of host computers, each host computer being used by a user capable of obtaining an operation authority over the volume in the storage, where the storage, the managing computer, and the host computers being interconnected via a network, and two or more users being capable of using an identical volume, the method comprising the steps of: obtaining an operation content in the host computer used by one user for the volume; determining whether the one user has the operation authority over the volume; determining whether other users have the operation authority over the volume; obtaining an attribute of the volume; obtaining the operation authority of the other users over the volume; determining from the attribute of the volume and the operation authority of the other users over the volume whether the operation content is executable; and when the operation content is not executable, restraining the operation content.

In an aspect of the volume management method of the invention, the method further comprises the step of: when the operation content is executable, changing the operation authority of the other users over the volume depending on the attribute of the volume.

In another aspect of the volume management method of the invention, the method further comprises the step of: upon determining whether the operation content for the volume is executable, displaying whether the operation on the volume is available.

In still another aspect of the volume management method of the invention, the method further comprises the steps of: upon execution of an operation by one user on at least one of the volumes over which two or more users have the operation authority, obtaining the attribute of the volume after the execution of the volume operation; according to the obtained attribute of the volume, determining whether the volume operation of other users is to be executed; and when there is no setup for the volume operation of the one user, executing the volume operation of the other users.

In still another aspect of the volume management method of the invention, the method further comprises the steps of: upon execution of an operation by one user on at least one of the volumes over which two or more users have the operation authority, obtaining the attribute of the volume after the execution of the volume operation; and according to the obtained attribute of the volume, delegating the operation authority of other users over the at least one volume to the one user.

In still another aspect of the volume management method of the invention, a process of causing the host computer controlling the volume to recognize the volume is treated as being covered by the operation authority of the user, and a process of executing setup for writing data into the volume or reading data from the volume by the host computer is treated as being covered by the operation authority of the user.

In still another aspect of the volume management method of the invention, a replication source volume and a replication destination volume is selected from a plurality of volumes, a process of replication from the replication source volume to the replication destination volume is treated as being covered by the operation authority of the user, and a status of the replication process is treated as the attribute of the volume.

What is claimed is:

1. A computer system comprising:
   at least one storage having one or more volumes configured to serve as a storage region;
   a host computer accessing the one or more volumes; and
   a management computer coupled to the at least one storage,
   wherein the management computer stores pair management information indicating:
      a first copy pair formed by a first copy source volume and a first copy target volume, and first pair status of the first copy pair; and
      a second copy pair formed by a second copy source volume and a second copy target volume, and second pair status of the second copy pair,
   wherein the first pair status and the second pair status can be changed between a plurality of status types for controlling copying or not-copying data from the first and second copy source volume to the first and second copy target volume, based on an operation request,
   wherein the management computer stores volume status information indicating a volume status for each volume, the volume status of said each volume being derived from:

pair status information of the pair management information, indicating a current pair status of the first copy pair or the second copy pair which includes said each volume; and other status information set for controlling an operation to said each volume;

wherein the management computer stores shared volume authority information for each shared volume of a plurality of shared volumes, the shared volume authority information providing authority to differing users to institute differing operations on a shared volume, dependent upon differing volume statuses of the shared volume, the shared volume authority information indicating that:

a first user has an authority to institute any of a first type of listed operation on a first subject volume of the first copy pair, while the current volume status of the first subject volume matches any volume status designated in a first subset of volume statuses which is a subset of possible volume statuses;

a second user has authority to institute any of a second type of listed operation on a second subject volume of the second copy pair, while the current volume status of the second subject volume matches any volume status designated in a second subset of volume statuses which is a subset of the possible volume statuses; and a third user has an authority to institute any of a third type of listed operation on the first subject volume of the first copy pair, while the current volume status of the first subject volume matches any volume status designated in a third subset of volume statuses which is a subset of the possible volume statuses, wherein the first subset, the second subset, and the third subset, are differing subsets of the possible volume statuses, from each other; and wherein the management computer executes to:

(A) receive the operation request indicating:
an operation user which is the first user or the second user or the third user;
an operation target volume; and
an operation content indicating content of the operation requested to be instituted to the operation target volume; and (B) determines whether the operation content of the operation requested to be instituted to the operation target volume by the operation user indicated in the operation request, is executable or not, based on the volume status information and the shared volume authority information.

2. A management method implemented in a computer system, where the computer system includes:

at least one storage having one or more volumes configured to serve as a storage region;

a host computer accessing the one or more volumes; and a management computer coupled to the at least one storage, the method comprising:

the management computer storing pair management information indicating:

a first copy pair formed by a first copy source volume and a first copy target volume, and first pair status of the first copy pair; and a second copy pair formed by a second copy source volume and a second copy target volume, and second pair status of the second copy pair, wherein the first pair status and the second pair status can be changed between a plurality of status types for controlling copying or not-copying data from the first and second copy source volume to the first and second copy target volume, based on an operation request, the management computer storing volume status information indicating a volume status for each volume, the volume status of said each volume being derived from:

pair status information of the pair management information, indicating a current pair status of the first copy pair or the second copy pair which includes said each volume; and other status information set for controlling an operation to said each volume;

the management computer storing shared volume authority information for each shared volume of a plurality of shared volumes, the shared volume authority information providing authority to differing users to institute differing operations on a shared volume, dependent upon differing volume statuses of the shared volume, the shared volume authority information indicating that:

a first user has an authority to institute any of a first type of listed operation on a first subject volume of the first copy pair, while the current volume status of the first subject volume matches any volume status designated in a first subset of volume statuses which is a subset of possible volume statuses;

a second user has an authority to institute any of a second type of listed operation on a second subject volume of the second copy pair, while the current volume status of the second subject volume matches any volume status designated in a second subset of volume statuses which is a subset of the possible volume statuses; and a third user has an authority to institute any of a third type of listed operation on the first subject volume of the first copy pair, while the current volume status of the first subject volume matches any volume status designated in a third subset of volume statuses which is a subset of the possible volume statuses, wherein the first subset, the second subset, and the third subset, are differing subsets of the possible volume statuses, from each other; and the management computer further:

(A) receiving the operation request indicating:
an operation user which is the first user or the second user or the third user;
an operation target volume; and
an operation content indicating content of the operation requested to be instituted to the operation target volume; and (B) determining whether the operation content of the operation requested to be instituted to the operation target volume by the operation user indicated in the operation request, is executable or not, based on the volume status information and the shared volume authority information.

3. A management computer deployable in a computer system, where the computer system includes:

at least one storage having one or more volumes configured to serve as a storage region;

a host computer accessing the one or more volumes; and the management computer coupled to the at least one storage, wherein the management computer is configured to implement operations comprising storing pair management information indicating:

a first copy pair formed by a first copy source volume and a first copy target volume, and first pair status of the first copy pair; and a second copy pair formed by a second copy source volume and a second copy target volume, and second pair status of the second copy pair, wherein the first pair status and the second pair status can be changed between a plurality of status types for controlling copying or not-copying data from the first and second copy source volume to the first and second copy target volume, based on an operation request, storing volume status information indicating a volume status for each volume, the volume status of said each volume being derived from:

pair status information of the pair management information, indicating a current pair status of the first copy pair or the second copy pair which includes said each volume; and other status information set for controlling an operation to said each volume;

storing shared volume authority information for each shared volume of a plurality of shared volumes, the shared volume authority information providing authority to differing users to institute differing operations on a shared volume, dependent upon differing volume statuses of the shared volume, the shared volume authority information indicating that:

a first user has an authority to institute any of a first type of listed operation on a first subject volume of the first copy pair, while the current volume status of the first subject volume matches any volume status designated in a first subset of volume statuses which is a subset of possible volume statuses;

a second user has an authority to institute any of a second type of listed operation on a second subject volume of the second copy pair, while the current volume status of the second subject volume matches any volume status designated in a second subset of volume statuses which is a subset of the possible volume statuses; and a third user has an authority to institute any of a third type of listed operation on the first subject volume of the first copy pair, while the current volume status of the first subject volume matches any volume status designated in a third subset of volume statuses which is a subset of the possible volume statuses, wherein the first subset, the second subset; and the third subset, are differing subsets of the possible volume statuses, from each other;

receiving the operation request indicating:

an operation user which is the first user or the second user or the third user;

an operation target volume; and an operation content indicating content of the operation requested to be instituted to the operation target volume; and determining whether the operation content of the operation requested to be instituted to the operation target volume by the operation user indicated in the operation request, is executable or not, based on the volume status information and the shared volume authority information.

* * * * *